United States Patent
Masters

(10) Patent No.: US 12,360,771 B2
(45) Date of Patent: Jul. 15, 2025

(54) RESCHEDULING A LOAD INSTRUCTION BASED ON PAST REPLAYS

(71) Applicant: Red Hat, Inc., Raleigh, NC (US)

(72) Inventor: Jonathan C. Masters, Boston, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/241,726

(22) Filed: Apr. 27, 2021

(65) Prior Publication Data

US 2022/0342672 A1  Oct. 27, 2022

(51) Int. Cl.
    *G06F 9/38*  (2018.01)
    *G06F 9/30*  (2018.01)
    *G06F 9/34*  (2018.01)

(52) U.S. Cl.
    CPC ........ *G06F 9/3836* (2013.01); *G06F 9/30043* (2013.01); *G06F 9/34* (2013.01); *G06F 9/3802* (2013.01)

(58) Field of Classification Search
    CPC .... G06F 9/3836; G06F 9/3802; G06F 9/3806; G06F 9/30043; G06F 9/34; G06F 9/3832
    See application file for complete search history.

(56) References Cited

U.S. PATENT DOCUMENTS

| | | | | |
|---|---|---|---|---|
| 5,136,697 A | * | 8/1992 | Johnson | G06F 9/3885 712/237 |
| 6,438,673 B1 | * | 8/2002 | Jourdan | G06F 9/3832 712/240 |
| 7,707,391 B2 | * | 4/2010 | Musoll | G06F 9/3851 712/220 |
| 7,861,066 B2 | * | 12/2010 | Dhodapkar | G06F 9/3836 712/214 |
| 7,930,485 B2 | * | 4/2011 | Fertig | G06F 12/0859 712/207 |
| 8,966,232 B2 | | 2/2015 | Tran | |
| 9,367,455 B2 | | 6/2016 | Eckert et al. | |
| 10,127,046 B2 | | 11/2018 | Col et al. | |
| 10,936,319 B2 | * | 3/2021 | Srinivasan | G06F 9/3836 |
| 2002/0152368 A1 | * | 10/2002 | Nakamura | G06F 9/383 712/E9.047 |
| 2003/0126406 A1 | * | 7/2003 | Hammarlund | G06F 9/3861 712/E9.05 |
| 2003/0177338 A1 | * | 9/2003 | Luick | G06F 9/3832 712/209 |

(Continued)

OTHER PUBLICATIONS

Memik, Gokhan & Reinman, Glenn & Mangione-Smith, William. Precise instruction scheduling. Journal of Instruction—Level Parallelism. 7. 1-29. (Year: 2005).*

(Continued)

*Primary Examiner* — Andrew Caldwell
*Assistant Examiner* — Kasim Alli
(74) *Attorney, Agent, or Firm* — Dority & Manning, P.A.

(57) ABSTRACT

Rescheduling a load instruction based on past replays is disclosed. A load replay predictor of a processor device determines, at a first time, that a load instruction is scheduled to be executed by a load store unit to load data from a memory location. The load replay predictor accesses load replay data associated with a previous replay of the load instruction and, based on the load replay data, causes the load instruction to be rescheduled.

11 Claims, 4 Drawing Sheets

(56) References Cited

U.S. PATENT DOCUMENTS

| | | | |
|---|---|---|---|
| 2003/0208665 A1* | 11/2003 | Peir | G06F 12/0859 |
| | | | 712/E9.05 |
| 2005/0268046 A1* | 12/2005 | Heil | G06F 12/0862 |
| | | | 711/137 |
| 2012/0117362 A1* | 5/2012 | Bhargava | G06F 9/3848 |
| | | | 712/E9.045 |
| 2019/0266096 A1 | 8/2019 | Lee et al. | |

OTHER PUBLICATIONS

"Cache Architecture and Design"<https://www.cs.swarthmore.edu/~kwebb/cs31/f18/memhierarchy/caching.html> (Year: 2021).*

R. E. Kessler, E. J. McLellan and D. A. Webb, "The Alpha 21264 microprocessor architecture," Proceedings International Conference on Computer Design. VLSI in Computers and Processors, pp. 90-95 (Year: 1998).*

Alves, Ricardo, et al., "Minimizing Replay under Way-Prediction," http://uu.diva-portal.org/smash/get/diva2:1316465/FULLTEXT01.pdf, 2019, 10 pages.

Kim, Ilhyun, et al., "Understanding Scheduling Replay Schemes," 10th International Symposium on High Performance Computer Architecture (HPCA'04), 2004, 12 pages.

Yoaz, Adi, et al., "Speculation Techniques for Improving Load Related Instruction Scheduling," ACM Computer Architecture News. 27. 42-53. 10.1109/ISCA.1999.765938, Feb. 1999, 13 pages.

* cited by examiner

RESCHEDULING A LOAD INSTRUCTION BASED ON PAST REPLAYS

BACKGROUND

Execution of a load instruction on a processor device is a fairly costly operation because it involves movement of data from one location, such as a memory, to another location, such as a register. At times, the load instruction must be re-executed, sometimes referred to as "replayed."

SUMMARY

The examples disclosed herein maintain load replay data for load instructions. The load replay data is indicative of whether a load instruction has been replayed previously. Based on the load replay data, a load instruction that is to be executed may be rescheduled to be executed later, thereby avoiding a potential costly subsequent replay of the load instruction.

In one example a method is disclosed. The method includes determining at a first time, by a load replay predictor of a processor device, that a load instruction is scheduled to be executed by a load store unit to load data from a memory location. The method further includes accessing, by the load replay predictor, load replay data associated with a previous replay of the load instruction. The method further includes, based on the load replay data, causing the load instruction to be rescheduled.

In another example a processor device is disclosed. The processor device includes a load store unit, and a load replay predictor to determine, at a first time, that a load instruction is scheduled to be executed by the load store unit to load data from a memory location. The load replay predictor is further to access load replay data associated with a previous replay of the load instruction. The load replay predictor is further to, based on the load replay data, cause the load instruction to be rescheduled.

In another example a non-transitory computer-readable storage medium is disclosed. The non-transitory computer-readable storage medium includes executable instructions to cause a load replay predictor of a processor device to determine, at a first time, that a load instruction is scheduled to be executed by a load store unit to load data from a memory location. The instructions further cause the load replay predictor to access load replay data associated with a previous replay of the load instruction. The instructions further cause the load replay predictor to, based on the load replay data, cause the load instruction to be rescheduled.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
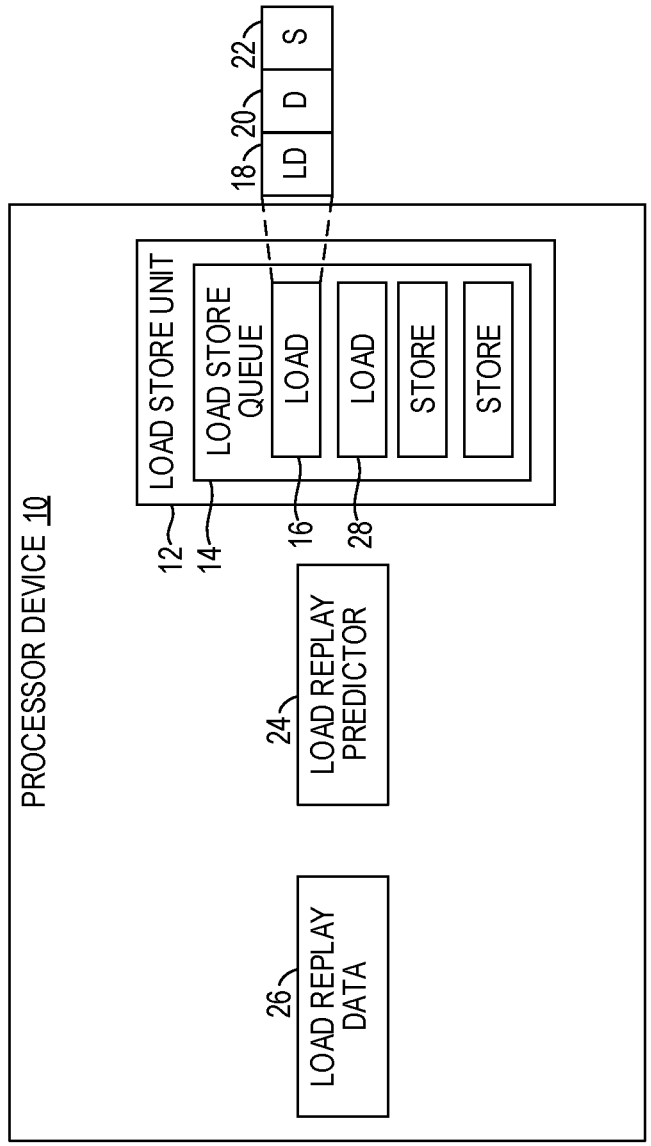
FIG. 1 is a block diagram of a processor device according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Execution of a load instruction on a processor device is a fairly costly operation because it involves movement of data from one location, such as a memory, to another location, such as a register. At times, the load instruction must be re-executed, sometimes referred to as "replayed." This may be for any number of reasons, including, for example, that the data in the memory location that is the subject of the load instruction may have changed since the previous load instruction was executed. In such situations, the previous execution of the load instruction was unnecessary, resulting in a reduction in performance.

The examples disclosed herein maintain load replay data for load instructions for use in determining whether a load instruction should be executed or should be rescheduled to be executed at a future point in time. The load replay data is indicative of whether a load instruction has been replayed previously. The load replay data may be stored, for example, in cache line metadata of a cache block that includes the load instruction. In other implementations, the load replay data may be stored, for example, in a machine-learned model, one or more bloom filters, or other suitable data structure. The load replay data may be updated over time as the load instruction is executed and not subsequently replayed and may also be updated when the load instruction is executed and subsequently replayed. Prior to executing the load instruction, a load replay predictor accesses the load replay data to determine whether the load instruction should be executed or rescheduled. For example, the load replay predictor may determine, based on the load replay data, that the load instruction has been replayed four of the last five times the load instruction was executed. The load replay predictor may then determine that the load instruction should be rescheduled rather than executed at the current point in time, and the load replay predictor causes the load instruction to be rescheduled to be executed later, thereby avoiding a potential costly subsequent replay of the load instruction.

FIG. 1 is a block diagram of a processor device 10 suitable for rescheduling a load instruction based on past replays according to one example. The processor device 10 includes a load store unit 12 that is configured to execute load instructions and store instructions. The load store unit 12 includes a load store queue 14 of load instructions and store instructions to be executed. In this example, a load instruction 16 includes a load operator 18, a destination location 20 where the data is to be loaded, and a source location 22 that identifies a location of the data to be loaded. The source location 22 may comprise, for example, a memory address. The source location 22 is referred to herein as the "subject" of the load instruction 16 because the source location 22 is the location of the data that will be loaded when the load instruction 16 is executed by the load store unit 12. It will be appreciated that the exact format of a load instruction will differ depending on the particular architecture of the processor device 10.

The processor device 10 includes a load replay predictor 24 that analyzes the load instruction 16 prior to the load instruction 16 being executed by the load store unit 12. In some implementations the load replay predictor 24 may be a component of the load store unit 12. In some implementations, the load store unit 12 may, immediately prior to executing the load instruction 16, invoke the load replay predictor 24 to determine if the load instruction 16 should be executed or should be rescheduled. The load replay predictor 24 accesses load replay data 26 to determine whether the load instruction 16 should be executed or should be rescheduled. The load replay data 26 contains data based on previous executions of the load instruction 16. The load replay data 26 may be based only on previous replays of the load instruction 16 or on both previous replays of the load instruction 16 and executions of the load instruction 16 that did not result in a replay.

In this example, the load replay predictor 24 determines, based on the load replay data 26, that the load instruction 16 should be rescheduled and not executed by the load store unit 12 at a first time. The load replay predictor 24 causes the load instruction 16 to be rescheduled. The load replay predictor 24 may then similarly process the next load instruction 28 to determine whether the load instruction 28 should be executed or should be rescheduled.

Figure 2:
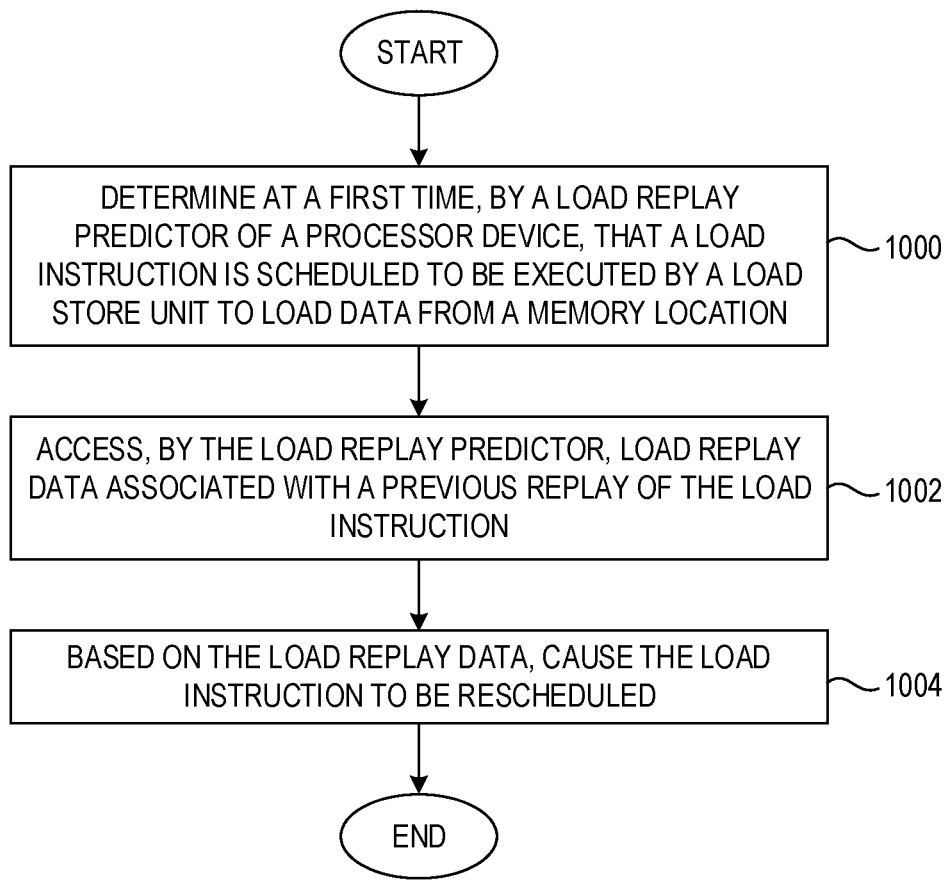
FIG. 2 is a flowchart of a method for rescheduling a load instruction based on past replays according to one implementation.

FIG. 2 is a flowchart of a method for rescheduling a load instruction based on past replays according to one implementation. FIG. 2 will be discussed in conjunction with FIG. 1. The load replay predictor 24 determines, at a first time, that the load instruction 16 is scheduled to be executed by the load store unit 12 to load data from a memory location (FIG. 2, block 1000). The load replay predictor 24 accesses the load replay data 26 associated with a previous replay of the load instruction 16 (FIG. 2, block 1002). The load replay predictor 24, based on the load replay data 26, causes the load instruction 16 to be rescheduled (FIG. 2, block 1004).

Figure 3:
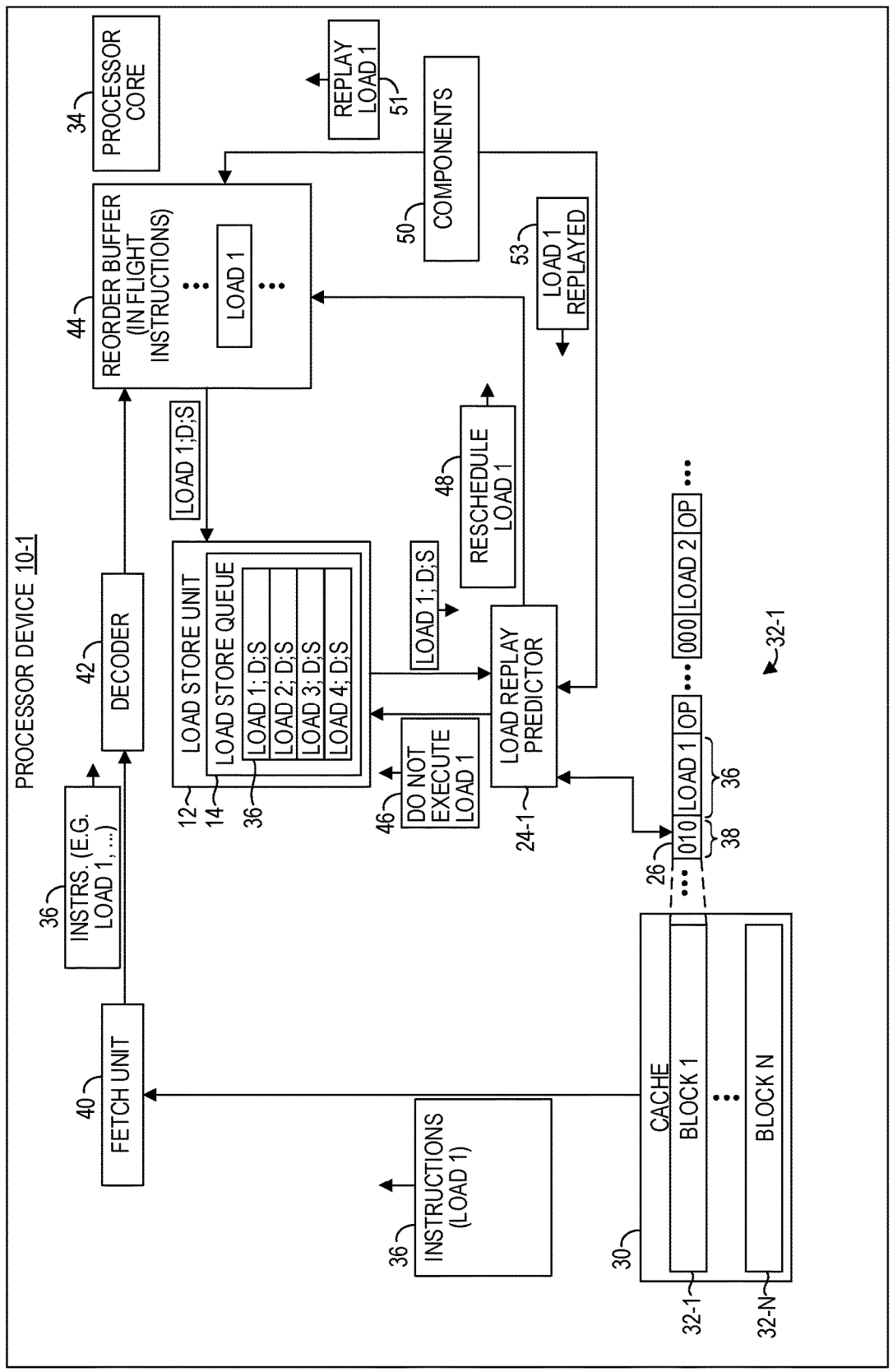
FIG. 3 is a block diagram of a processor device suitable for rescheduling a load instruction based on past replays according to another implementation.

FIG. 3 is a block diagram of a processor device 10-1 suitable for rescheduling a load instruction based on past replays according to another implementation. In this example, the processor device 10-1 includes the load store unit 12 and a load replay predictor 24-1. The load replay predictor 24-1 operates substantially similarly to the load replay predictor 24 of FIG. 1, except as otherwise noted herein.

The processor device 10-1 includes a cache memory 30 in which cache blocks 32-1-32-N (generally, cache blocks 32, and sometimes referred to as cache lines) are stored prior to execution by a processor core 34. Each cache block 32 comprises data identifying one or more processor instructions 36, and cache line metadata 38 (e.g., information) about the processor instructions 36. The data identifying the one or more processor instructions 36 may comprise a reference to another cache memory, or a location in a different memory where the processor instructions 36 are located, or may comprise the actual processor instructions 36.

A fetch unit 40 accesses the cache block 32-1 to begin the process of executing the processor instructions 36 contained in the cache block 32-1. The fetch unit 40 sends the processor instructions 36 to a decoder 42. After the processor instructions 36 are decoded, the processor instructions 36 are dispatched to a reorder buffer 44. The reorder buffer 44 may send certain processor instructions 36, such as load and store instructions, to the load store unit 12 for execution.

The load store unit 12 may, prior to executing a next load instruction 36, invoke the load replay predictor 24-1 to determine whether the load instruction 36 should be executed or should be rescheduled. The load replay predictor 24-1 may be provided, for example, the address of the load instruction 36 and the address of the subject of the load instruction 36. In some implementations, the load replay predictor 24-1 may be a component of the load store unit 12. The load replay predictor 24-1 receives the address of the load instruction 36 and the address of the memory location that is the subject of the load instruction 36. The load replay predictor 24-1 determines the corresponding cache line metadata 38 in the cache block 32-1 that corresponds to the load instruction 36.

The cache line metadata 38 comprises load replay data 26 that is indicative of whether or not the load instruction 36 has been previously replayed. In this example, the load replay predictor 24-1 determines, based on the cache line metadata 38, that the load instruction 36 should be rescheduled and not executed by the load store unit 12 at this time. The load replay predictor 24-1 may return a message 46 to the load store unit 12 to not execute the load instruction 36. The load replay predictor 24-1 or the load store unit 12 may send a message 48 to the reorder buffer 44 to reschedule the load instruction 36 for subsequent execution by the load store unit 12.

For various reasons, any of a number of components 50 of the processor device 10-1, including, by way of non-limiting example, the load store unit 12, may determine that a load instruction 36 has to be replayed. Such components 50 send an appropriate replay message 51 to the reorder buffer 44 or other suitable component to cause the load instruction 36 to be replayed and also send a message 53 to the load replay predictor 24-1 that indicates the load instruction 36 needed to be replayed. The message 53 may include, for example, the address of the load instruction 36 and/or the address of the memory location that is the subject of the load instruction 36. Based on the message 53, the load replay predictor 24-1 updates the load replay data in the cache line metadata 38 to indicate that the load instruction 36 was replayed.

Figure 4:
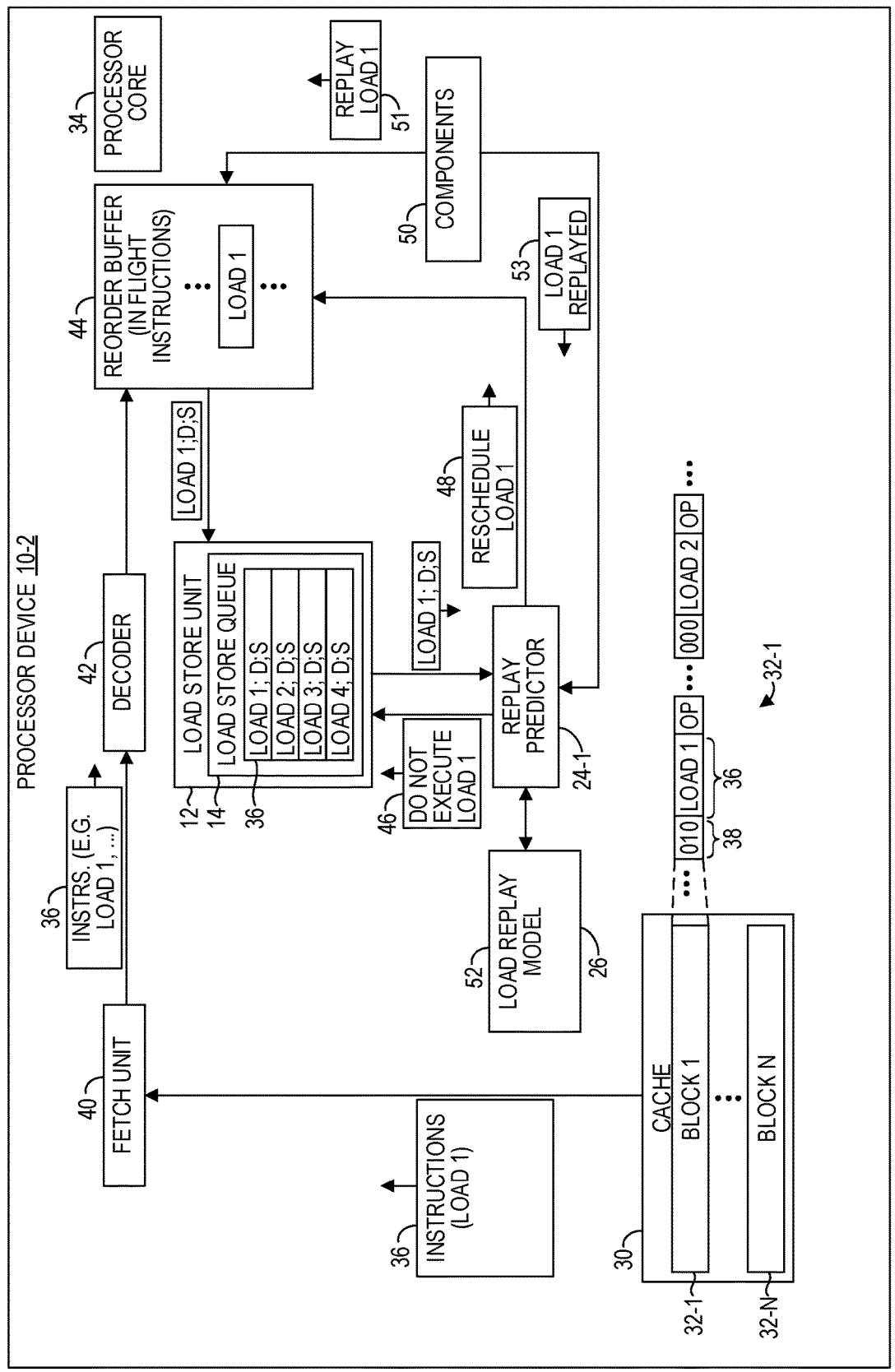
FIG. 4 is a block diagram of a processor device suitable for rescheduling a load instruction based on past replays according to another implementation.

FIG. 4 is a block diagram of a processor device 10-2 suitable for rescheduling a load instruction based on past replays according to another implementation. The processor device 10-2 is substantially similar to the processor device 10-1 except as otherwise discussed herein. In this implementation, the load replay data 26 is in the form of a load replay model 52. The load replay model 52 may comprise a machine-learned model, one or more bloom filters, or other suitable data structure. The load replay model 52 receives and processes two types of inputs, load replay inputs that indicate that a load instruction has been replayed, and request inputs requesting whether a load instruction should be rescheduled. The load replay inputs may include, for example, the memory address of the load instruction and/or the memory address of the subject of the load instruction. The load replay model 52 processes each load replay input such that if a request input is received for the same load instruction, the load replay model 52 may then issue a prediction, based on previous load replay inputs for the same load instruction, if any, as to whether the load instruction is likely to be replayed. In some implementations, the load replay model 52 may respond with an indication that the load instruction should be rescheduled, or an indication that the load instruction should be executed. A request input may also include one or more of the memory address of the load instruction and the memory address of the subject of the load instruction.

While for purposes of illustration the load instructions discussed herein have been programmatic load instructions that are embodied in executable program instructions, the examples disclosed herein are also applicable to internal load instructions that are generated by the processor device 10, 10-1, or 10-2 from time to time to cause the loading of data from a memory location to a memory register, for example. Such load instructions may be identified by the memory address of the load instruction.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a load store unit of a processor device, a load instruction to load data from a memory location, the load instruction identified in a cache line of a cache memory, the cache line comprising one or more processor instructions and cache line metadata associated with the one or more processor instructions, the one or more processor instructions comprising the load instruction;
   determining at a first time, by a load replay predictor of the processor device, that the load instruction is scheduled to be executed by the load store unit;
   accessing, by the load replay predictor from the cache line metadata, load replay data associated with a previous replay of the load instruction;
   based on the load replay data, causing, by the load replay predictor, the load instruction to be rescheduled for subsequent execution;
   sending, by the load replay predictor to the load store unit, a first message indicating that the load instruction is not to be executed;
   in response to causing the load instruction to be rescheduled for subsequent execution, causing, by the processor device at a second time subsequent to the first time, execution of the load instruction;
   receiving, by the load replay predictor from a component of the processor device, a second message indicating that the load instruction was executed, wherein the second message comprises a memory address from which the load instruction is to load the data; and
   based on the second message, updating, by the load replay predictor, the load replay data to indicate that the load instruction was executed.

2. The method of claim 1 wherein the load instruction is a programmatic instruction from an executable program.

3. The method of claim 1 wherein the load instruction is an internal load instruction generated by the processor device.

4. The method of claim 1 further comprising:
   determining, at a time prior to the first time, that the load instruction is scheduled to be executed to load the data from the memory location;
   executing the load instruction to load the data from the memory location;
   subsequently determining that the load instruction must be replayed; and
   generating the load replay data based on determining that the load instruction must be replayed.

5. The method of claim 4 further comprising:
   storing, by the load replay predictor, the load replay data in the cache line metadata that corresponds to the load instruction.

6. A processor device comprising:
   a load store unit to:
     receive a load instruction to load data from a memory location, the load instruction identified in a cache line of a cache memory, the cache line comprising one or more processor instructions and cache line metadata associated with the one or more processor instructions, the one or more processor instructions comprising the load instruction; and
   a load replay predictor to:
     determine, at a first time, that the load instruction is scheduled to be executed by the load store unit;
     access, from the cache line metadata, load replay data associated with a previous replay of the load instruction;
     based on the load replay data, cause the load instruction to be rescheduled for subsequent execution;
     send, to the load store unit, a first message indicating that the load instruction is not to be executed;
     in response to causing the load instruction to be rescheduled for subsequent execution, cause, at a second time subsequent to the first time, execution of the load instruction;
     receive, from a component of the processor device, a second message indicating that the load instruction was executed, wherein the second message comprises a memory address from which the load instruction is to load the data; and
     based on the second message, update the load replay data to indicate that the load instruction was executed.

7. The processor device of claim 6 wherein the load instruction is a programmatic instruction from an executable program.

8. The processor device of claim 6 wherein the load replay predictor is further to:
   determine, at a time prior to the first time, that the load instruction is scheduled to be executed to load the data from the memory location;
   execute the load instruction to load the data from the memory location;
   subsequently determine that the load instruction must be replayed; and
   generate the load replay data based on determining that the load instruction must be replayed.

9. The processor device of claim 8 wherein the load replay predictor is further to:
store the load replay data in the cache line metadata that corresponds to the load instruction.

10. A non-transitory computer-readable storage medium including executable instructions to cause a processor device to:
receive, by a load store unit of the processor device, a load instruction to load data from a memory location, the load instruction identified in a cache line of a cache memory, the cache line comprising one or more processor instructions and cache line metadata associated with the one or more processor instructions, the one or more processor instructions comprising the load instruction;
determining at a first time, by a load replay predictor of the processor device, that the load instruction is scheduled to be executed by the load store unit;
accessing, by the load replay predictor from the cache line metadata, load replay data associated with a previous replay of the load instruction;
based on the load replay data, causing, by the load replay predictor, the load instruction to be rescheduled for subsequent execution;
sending, by the load replay predictor to the load store unit, a first message indicating that the load instruction is not to be executed;
in response to causing the load instruction to be rescheduled for subsequent execution, causing, by the processor device at a second time subsequent to the first time, execution of the load instruction;
receiving, by the load replay predictor from a component of the processor device, a second message indicating that the load instruction was executed, wherein the second message comprises a memory address from which the load instruction is to load the data; and
based on the second message, updating, by the load replay predictor, the load replay data to indicate that the load instruction was executed.

11. The non-transitory computer-readable storage medium of claim 10, wherein the load instruction is a programmatic instruction from an executable program.

* * * * *